United States Patent
Jacobs

[11] 3,842,827
[45] Oct. 22, 1974

[54] ENDOCERVICAL CONTRACEPTIVE DEVICE

[76] Inventor: Edith Hope Jacobs, 402 Mohawk Dr., Jeffersonville, Ind. 47130

[22] Filed: June 26, 1973

[21] Appl. No.: 373,621

Related U.S. Application Data

[63] Continuation-in-part of Ser. No. 240,367, April 4, 1972, abandoned.

[52] U.S. Cl. ............................................. 128/131
[51] Int. Cl. ............................................. A61f 5/46
[58] Field of Search ........... 128/127, 128, 129, 130, 128/131; 85/8.1, 8.3; 24/150 FD, 102 T

[56] References Cited
UNITED STATES PATENTS

| | | | |
|---|---|---|---|
| 2,844,144 | 7/1958 | Massey | 128/131 |
| 3,467,088 | 9/1969 | Robinson | 128/130 |
| 3,467,090 | 9/1969 | Zollett | 128/131 |
| 3,516,403 | 6/1970 | Cournut | 128/130 |
| 3,734,089 | 5/1973 | Gaud | 128/130 |

*Primary Examiner*—Richard A. Gaudet
*Assistant Examiner*—G. F. Dunne
*Attorney, Agent, or Firm*—Clarence A. O'Brien; Harvey B. Jacobson

[57] ABSTRACT

A contraceptive device including an elongated stem with an elarged head at one end and extended endwise outwardly divergent and reversely curving resilient legs at the other end. The head is mushroom shaped and the legs are sufficiently bendable or pliable so as to be deflected or flexed into side-by-side parallel relation closely adjacent the centerline of the stem. A sleeve is disposed on the stem adjacent the head and between the latter and the base ends of the legs. The sleeve includes an enlarged mushroom-shaped head of a diameter greater than the diameter of the head of the stem and including an endwise outwardly opening recess in which to receive the head of the stem. The sleeve is shiftable along the stem away from the head end thereof to a position with the legs retracted into the end of the stem remote from its head end and the contraceptive device may be lengthwise inserted within a cervix with the head of the stem disposed outward and the remote end of the sleeve passed inwardly just through the cervix while the legs are disposed in their retracted positions. The sleeve is constructed of stiff but somewhat flexible and expandible material and the stem includes a slightly diametrically enlarged portion adjacent the base ends of the legs thereof. After insertion, the stem is pushed inward relative to the sleeve so as to project the legs to their extended positions and to seat the head of the stem in the outwardly opening recess formed in the head of the sleeve. The diametrically enlarged portion of the stem includes a frusto-conical seating surface facing toward the head of the stem and when the stem is pushed inward to extend the legs the frusto-conical seating surface is displaced partly outwardly of the end of the sleeve remote from the head and tightly seated against the adjacent end edges of the sleeve.

11 Claims, 14 Drawing Figures

PATENTED OCT 22 1974 3,842,827

ENDOCERVICAL CONTRACEPTIVE DEVICE

This application comprises a continuation-in-part of my copending U.S. application Ser. No. 240,367, filed April 4, 1972, for Endocervical Contraceptive Device, now abandoned.

The contraceptive device of the instant invention has been designed primarily as an effective contraceptive apparatus to be inserted only by gynecologists and possibly other skilled persons. The device acts to inhibit contraception in three different ways. It functions first as a closure across the outer end of the cervix as a barrier to the passage of spermatozoa into the cervical canal. Secondly, it includes reversely curving and divergent leg portions thereof for disposition within the uterus, thereby functioning as a contraceptive device inasmuch as the presence of a foreign object within the uterus represents a condition which is not conducive to conception. Thirdly, the device also functions to maintain the cervix partially dilated, which condition is also not conducive to conception.

The contraceptive device is constructed in a manner whereby contraction of the uterine muscle is not induced and therefore there is little likelihood of the device being expelled. Further, the contraceptive device does not interfere with uterine drainage or menses and will not cause cramps or bleeding after initial insertion.

The main object of this invention is to provide a contraceptive device which may be worn internally without discomfort or adverse side effects for contraceptive purposes.

Another object of this invention is to provide a contraceptive device in accordance with the preceding object and constructed in a manner whereby trained persons such as gynecologists and physicians may readily take measurements for and insert the proper size device.

Another object of this invention is to provide a contraceptive device including structural features thereof which perform in at least three different ways to promote contraception.

Yet another object of this invention is to provide a contraceptive device that may be utilized by substantially all women and with only one dimension of the device being varied in order to adapt the device for use by a particular woman.

A further object of this invention is to provide a tool by which the contraceptive device may be readily initially inserted into the cervix and subsequently have the stem portion thereof shifted to the extended position with the legs fully extended.

A final object of this invention to be specifically enumerated herein is to provide a contraceptive device in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
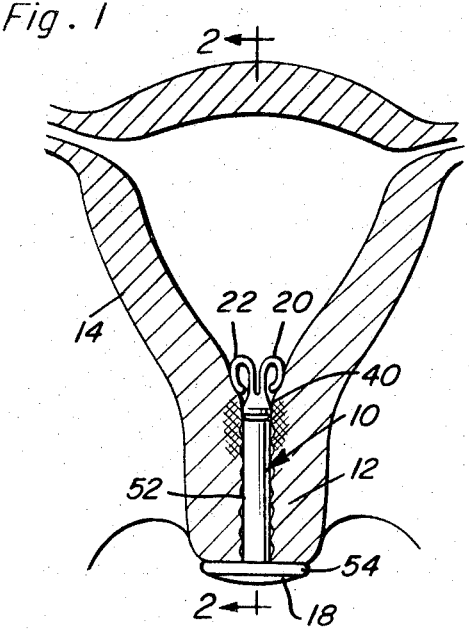
FIG. 1 is a front elevational view of the contraceptive device with the stem portion in the operative position and the legs thereof in their extended outwardly divergent and reversely bent positions, the contraceptive device being illustrated in position in the cervix of a uterus and with the uterus being illustrated in transverse vertical section.

Referring now more specifically to the drawings, the numeral 10 generally designates the contraceptive device of the instant invention which is designed for insertion through the cervix 12 of a uterus 14.

The contraceptive device 10 includes an elongated stem or shank 16 having a mushroom shaped head 18 on one end and a pair of integral endwise outwardly divergent spring legs 20 and 22 on the other end. The legs 20 and 22 include base end portions 24 and 26 which are spaced slightly apart and form extensions of the adjacent end of the shank 16. The base ends 24 and 26 terminate outwardly in reversely curving portions 28 and 30 which in turn terminate in reversely directed outer ends 32 and 34 in turn terminating in inwardly curving terminal ends 36 and 38.

Figure 6:
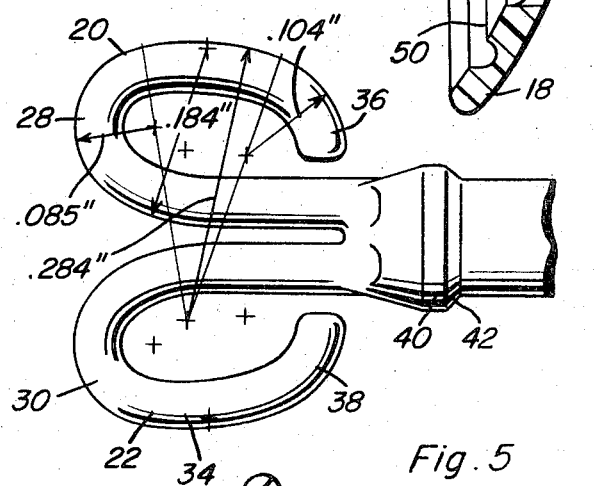
FIG. 6 is an enlarged fragmentary side elevational view of the inner end portion of the stem from which the outwardly divergent and reversely curved legs are supported.

From FIG. 6 of the drawings it will be seen that the portions of the reversely curving portions 28 and 30 adjacent the base ends 24 and 26 include a radius of curvature of approximately 0.184 inch and that the remaining outer end portions of the portions 28 and 30 include a radius of curvature of approximately 0.085 inch. Also, the reversely directed outer ends 32 and 34 are slightly longitudinally arched and have a radius of curvature of approximately .284 inch. Finally, the terminal ends 36 and 38 include a radius of curvature of approximately 0.104 inch.

Figure 5:
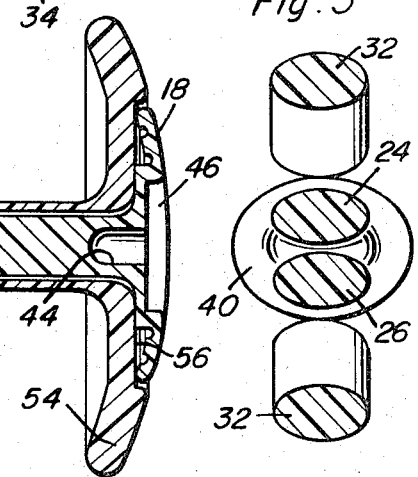
FIG. 5 is an enlarged fragmentary transverse vertical sectional view taken substantially upon the plane indicated by the section line 5—5 of FIG. 4.

From FIG. 5 of the drawings it may be seen that the legs 20 and 22 are oval in cross-sectional shape with a minor transverse dimension of approximately 0.05 inch and a major cross-sectional dimension of approximately 0.1 inch.

Figure 3:
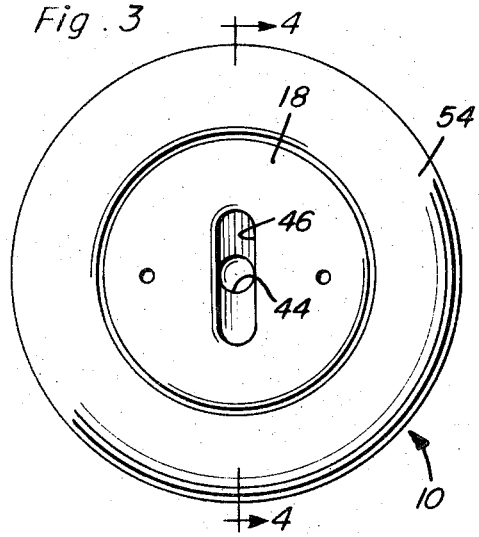
FIG. 3 is an enlarged elevational view of the head end of the contraceptive device.
Figure 7:
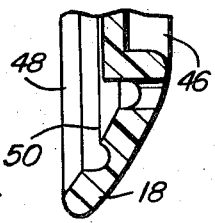
FIG. 7 is an enlarged fragmentary vertical sectional view illustrating a peripheral portion of the mushroom shaped head of the stem portion of the contraceptive device.

The stem 16 is also oval in cross-sectional shape and includes a diametrically enlarged portion 40 closely adjacent the base ends 24 and 26 of the legs 20 and 22. The diametrically enlarged portion 40 includes an oval frusto-conical seating surface 42 which faces toward the head 18 and it may be seen from FIGS. 3 and 4 of the drawings that the outer side of the head 18 includes a rounded bottom axial blind bore 44 including an oval counterbore 46. Still further, from FIGS. 4 and 7 of the drawings it may be seen that the underside of the head 18 is provided with two circumferentially extending and radially spaced ribs 48 and 50 and that the head is generally partial spherical in configuration.

Figure 4:
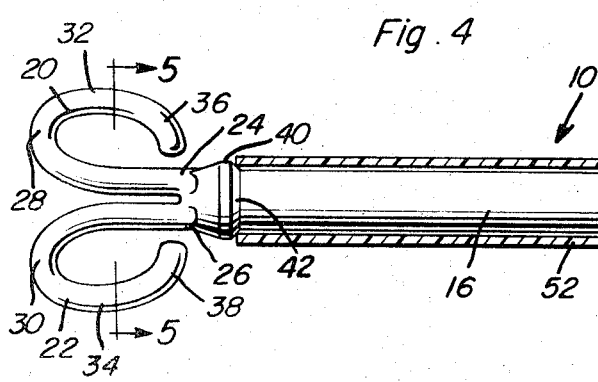
FIG. 4 is an enlarged side elevational view of the contraceptive device with the stem portion thereof in the operative position and with portions of the sleeve and stem portions being broken away and illustrated in longitudinal vertical section.

From FIG. 4 of the drawings it will also be seen that the device 10 includes a sleeve 52 telescoped over the portion of the stem 16 intermediate the diametrically enlarged portion 40 and the head 18. The end of the sleeve 52 adjacent the head 18 includes a diametrically enlarged mushroom shaped head 54 which is of larger diameter than the head 18 and includes a central circular recess 56 on its outer side in which the head 18 is seatingly receivable. Further from FIG. 4 of the drawings it will be noted that when the head 18 is fully seated within the recess 56 the head is at least slightly flexed so as to closely conform to the larger radius of curvature of the outer surface of the head 54. Also, when the head 18 is fully seated within the recess 56 the diametrically enlarged portion 40 projects substantially entirely outwardly of the end of the sleeve 52 remote from the head 54 with the seating surface 42 tightly sealingly engaged with the adjacent end of the sleeve 52.

The contraceptive device is illustrated in FIG. 4 with the stem and legs in the operative positions thereof. However, in order to insert the device 10 within the cervix 12 it is necessary to shift the sleeve 52 downwardly over the legs 20 and 22 so as to straighten and receive the latter in the end of the sleeve 52 remote from the head 54. Further, it is to be noted that the stem and sleeve will be constructed of any suitable material having at least an outer surface portion which is inert. Further, the material of which the stem and sleeve will be constructed must be sufficiently stiff, but bendable and resilient to enable the legs 20 and 22 to automatically assume the shapes thereof illustrated in FIG. 4 of the drawings after the legs 20 and 22 have been extended to the operative position from the retracted positions thereof illustrated in FIG. 8. Further, when the sleeve 52 is telescoped downwardly over the legs 20 and 22, the diametrically enlarged portion 40 of the stem 16 is wedgingly received in the sleeve 52 and slightly enlarges that portion of the sleeve in which the diametrically enlarged portion 40 is disposed. It is believed readily apparent that there are various types of plastics from which the contraceptive device 10 may be readily constructed. In any event, with the legs 20 and 22 in the retracted positions illustrated in FIG. 8, the device 10 may be inserted into the patient's vagina and through the cervix 12. Thereafter, the shank 16 is shifted from the position thereof illustrated in FIG. 8 of the drawings (relative to the sleeve 52) to the position thereof illustrated in FIG. 4 of the drawings whereupon the legs 20 and 22 will be extended into their reversely curving positions within the uterus 14. Of course, the reversely curving extended legs 20 and 22 serve to prevent accidental dislodgment of the device 10 and also as a foreign object within the uterus to inhibit contraception. Still further, the sleeve 16 of the device 10, by passing through the cervix 12, maintains the cervix 12 in a slightly dilated condition, which condition also is not conducive to conception. Finally, the head 54 of the sleeve 62 abuts against the closes the outer end of the cervix functioning as a barrier to the passage of spermatozoa into the cervical canal.

Because the head 18 is flexed slightly when the sleeve 16 is shifted into its final operative position illustrated in FIG. 4 of the drawings and the slight flexing of the head 18 is maintained by engagement of the seating surface 42 with the end of the sleeve 52 remote from the head 54, The head 18 tightly seals the outer end of the sleeve in order to prevent spermatozoa from passing upwardly through the sleeve 52 about the shank 16. In addition, the tight seated engagement of the seating surface 42 with the end of the sleeve 52 remote from the head 54 also serves as a seal against spermatozoa passing upwardly through the sleeve 52 and into the uterus 14.

With attention now invited more specifically to FIGS. 9 through 14 of the drawings there may be seen a tool referred to in general by the reference numeral 60 and which has been designed specifically to assist a gynecologist or other qualified person in properly inserting the device 10 in a patient's cervix and thereafter fully extending the legs of the device 10 without pain or injury to the patient.

The tool 60 comprises a pair of elongated identically formed channel shaped levers 62 and 64 which open toward each other and are pivotally joined together by means of a pivot fastener 66 secured through corresponding overlapping flanges 68 adjacent the handle ends of the levers 62 and 64. The remote ends of the levers 62 and 64 include transversely grooved opposing lips 70 and 72 and an elongated slide 76 longitudinally grooved along its opposite marginal edge portions as at 78 and 80 is slidingly supported from corresponding center longitudinal flange portions 82 of the levers 62 and 64. The slide 76 includes a thumb-engageable portion 84 on the end thereof adjacent the pivot fastener 66 and the remote end of the slide 76 includes a center cylindrical extension 86 whose outer end is rounded and is adapted to be snugly seated within the blind bore 44. The extension 86 is supported from a reduced diameter forward end portion 88 of the slide 76 and the portion 88 is oval in cross-sectional shape for seating within the counterbore 46 and thus keying the diametrically reduced portion 88 to the shank 16. Finally, the channel-shaped levers 62 and 64 include first and second pairs of corresponding abuttingly engageable flanges 90 and 92 on opposite sides of the pivot fastener 66 and the flanges 92 are abuttingly engageable with each other to limit movement of the remote ends of the levers 62 and 64 apart. Also, the flanges 90 are abuttingly engageable with each other to limit movement of the forward ends of the levers 62 and 64 toward each other.

Figure 8:
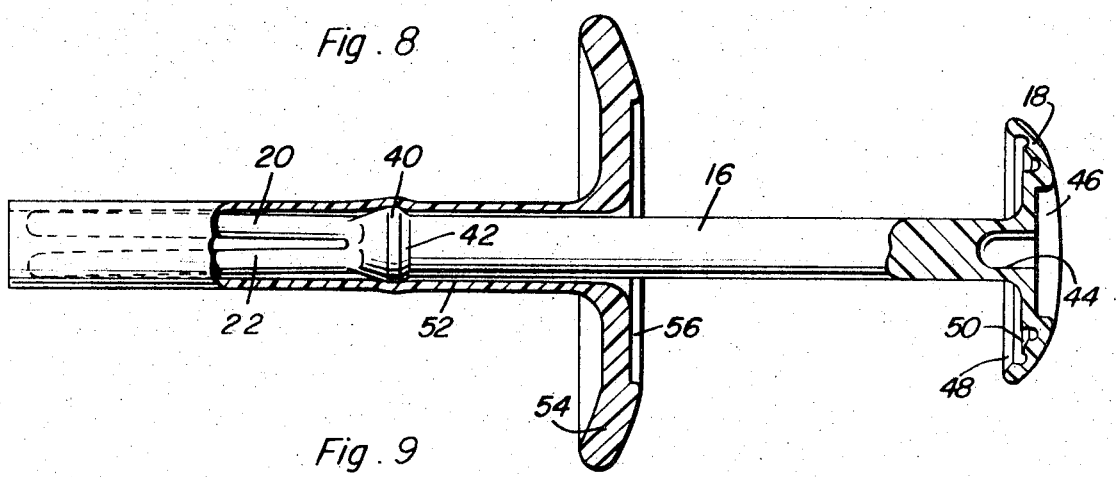
FIG. 8 is an enlarged side elevational view of the contraceptive device with the stem portion thereof in retracted position and portions of the sleeve and stem portion being broken away and illustrated in vertical section.
Figure 9:
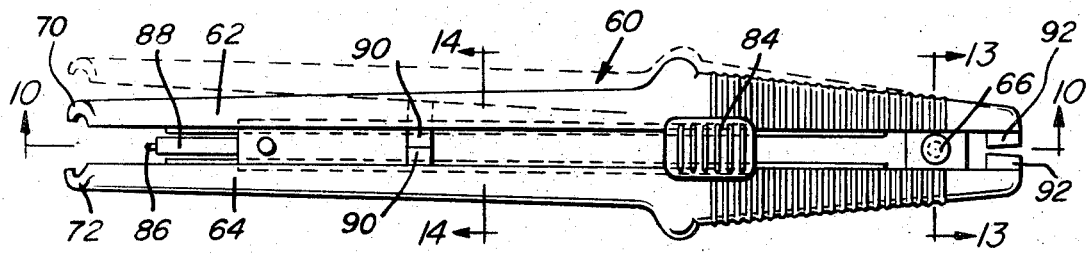
FIG. 9 is a side elevational view of a tool specifically designed to be used in insertion of the contraceptive device in a cervix and also for the purpose of shifting the stem portion of the contraceptive device to its operative position after the contraceptive device has been inserted in the cervix.
Figure 10:
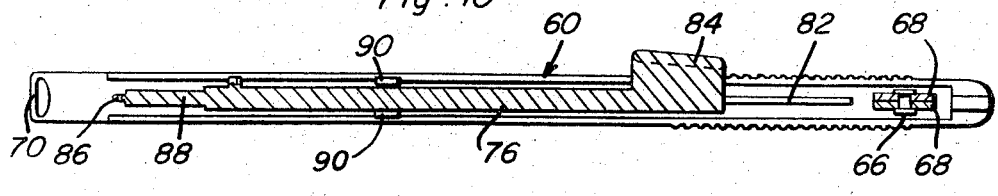
FIG. 10 is a longitudinal sectional view taken substantially upon the plane indicated by the section line 10—10 of FIG. 9.
Figure 11:
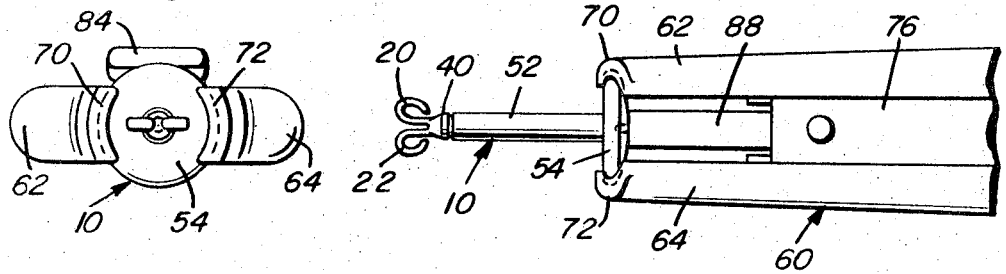
FIG. 11 is an enlarged end elevational view of the insertion tool illustrated in FIGS. 9 and 10 and as seen from the left side of FIG. 10.
Figure 12:
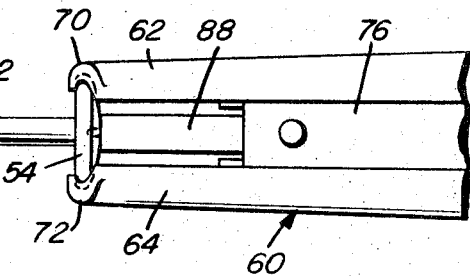
FIG. 12 is an enlarged fragmentary side elevational view of the end portion of the tool from which the contraceptive device may be supported and with the contraceptive device supported from the tool.
Figure 13:
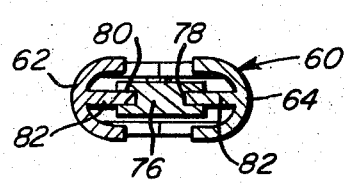
FIG. 13 is an enlarged fragmentary sectional view taken substantially upon the plane indicated by the section line 13—13 of FIG. 9.
Figure 14:
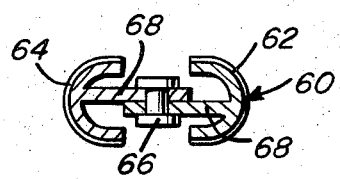
FIG. 14 is an enlarged transverse sectional view taken substantially upon the plane indicated by the section line 14—14 of FIG. 9.

It will be appreciated that diametric opposite portions of the head 54 may be supported from the end portions 70 and 72 of the levers 62 and 64 when the apparatus 10 has its relative parts positioned as illustrated in FIG. 8 of the drawings. When thus supported from the tool 60 the head 18 of the shank 16 is received well inwardly between the forward ends of the levers 62 and 64 with the terminal end 86 seated in the bore 44 and the diametrically reduced portion 88 seated in the counterbore 46. Then, with manual pressure being applied to the levers 62 and 64 to urge the forward ends thereof together the tool 60 may be utilized to insert the device 10 within the cervical canal while the legs 20 and 22 are in their retracted positions. Thereafter, with manual pressure still applied to the levers 62 and 64 to maintain the forward ends thereof against separation, thumb pressure may be applied to the thumb-engageable portion 84 so as to slide the slide 76 toward the end portions 70 and 72 of the levers 62 and 64 whereupon the shank 16 will be shifted relative to the sleeve 52 from the position thereof illustrated in FIG. 8 of the drawings to the position thereof illustrated in FIGS. 1 and 4.

Figure 2:
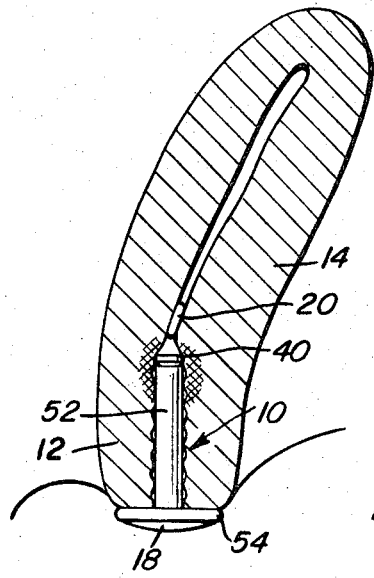
FIG. 2 is a sectional view taken substantially upon the plane indicated by the section line 2—2 of FIG. 1.

The only dimension of the device 10 which need be changed in order to custom fit the device to a particular woman is the length of the sleeve 52 between the head 54 and the free end of the sleeve and the length of the shank 16 from the head 18 to the diametrically enlarged portion 40. Of course, after the device 10 has been inserted in the manner illustrated in FIGS. 1 and 2 of the drawings, the extended legs 20 and 22 will prevent accidental dislodgment of the device 10 and the latter will function in at least three different ways to prevent contraception.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A contraceptive device comprising an elongated stem including an enlarged head at a first end thereof and at least one pair of endwise outwardly divergent and back-turned resilient legs at the other end, a sleeve constructed of shape retentive but at least somewhat flexible and resilient material slidably disposed on said stem intermediate said head and the base end of said legs for extension over said legs from the base ends thereof for retraction of the legs into the adjacent end portion of said sleeve with said legs bent toward each other at their free ends and disposed generally parallel and within said sleeve, said sleeve being of a length adapted to correspond with the length of the cervical canal of the user, said stem including a diametrically enlarged portion thereof adjacent the base ends of said legs wedgingly telescoped into the adjacent end of said sleeve, said sleeve being shiftable toward and into abutted engagement with said head, said enlarged portion including a generally conical seating surface tapering toward said head and at least partially wedgingly seated in the end of said sleeve when said sleeve is abutted against said head, whereby the resiliency of said material, in conjunction with the taper of said seating surface, tends to cam said sleeve toward said head into tight abutted engagement therewith, the seated engagement of said seating surface in the end of said sleeve remote from said head sealingly closing that end of the sleeve.

2. The combination of claim 1 wherein said stem, head, sleeve and legs include at least outer surface portions constructed of inert material.

3. The combination of claim 1 wherein the end of said sleeve adjacent the head of said stem includes a second diametrically enlarged head having an endwise opening recess formed therein, the head of said stem being seated in said recess when said sleeve is abutted against the head of said stem and said seating surface is wedgingly seated in the adjacent end of said sleeve.

4. The combination of claim 3 wherein the head on said sleeve is generally circular and concentric with the center axis of said sleeve.

5. The combination of claim 1 wherein said stem includes a single pair of legs.

6. The combination of claim 1 wherein the free ends of said legs terminate closely adjacent the corresponding base ends thereof when said legs are fully extended and said free ends are directed inwardly generally radially of the center axis of said stem.

7. The combination of claim 1 wherein the end of said sleeve adjacent the head of said stem includes a second diametrically enlarged head having an endwise opening recess formed therein, the head of said stem being seated in said recess when said sleeve is abutted against the head of said stem and said sealing surface is wedgingly seated in the adjacent end of said sleeve, the under surface of the head of said sleeve being concavely dished for embracing abutment with the anterior end of the cervix disposed about the cervical canal.

8. The combination of claim 1 wherein the end of said sleeve adjacent the head of said stem includes a second diametrically enlarged head having an endwise opening recess formed therein, the head of said stem being seated in said recess when said sleeve is abutted against the head of said stem and said sealing surface is wedgingly seated in the adjacent end of said sleeve, the under surface of the head of said stem being concavely dished and said stem head being slightly flexed when seated in said recess for tight seal forming engagement of the outer peripheral portion of the undersurface of said stem head in said recess when said sleeve is shifted toward said head to free said legs for movement to their extended positions.

9. The combination of claim 1 wherein said legs, when extended, form generally oval loops.

10. The combination of claim 1 wherein the end of said sleeve adjacent the head of said stem includes a second diametrically enlarged head having an endwise opening recess formed therein, the head of said stem being seated in said recess when said sleeve is abutted against the head of said stem and said sealing surface is wedgingly seated in the adjacent end of said sleeve, and a tool for installing said contraceptive device, said tool comprising a pair of elongated levers pivotally interconnected intermediate their opposite ends, one pair of ends of said levers, adjacent the pivotal connection between said levers, comprising hand grips and the free ends of said one pair of ends of said levers defining opposing partial circular channel shaped grooves opening toward each other removably embracingly clamping opposite side portion of the head of said sleeve therebetween with said one end of said shank facing said pivotal connection and received between said one pair of ends of said levers, and a slide supported from said one pair of ends of said levers between the latter for movement toward and away from said pivotal connection, said slide including an end portion engageable with the head of said stem upon movement of said slide away from said pivotal connection.

11. The combination of claim 10 wherein said one pair of ends of said levers include opposing, spaced and parallel longitudinal flange portions, said slide including opposite side longitudinal grooves in which said flange portions are slidingly received.

* * * * *